United States Patent [19]
Tominaga

[11] Patent Number: 6,044,799
[45] Date of Patent: Apr. 4, 2000

[54] LIP MEMBER FOR AN OPENING OF A HOUSING FOR A SMALL PET ANIMAL SUCH AS A RODENT AND HOUSING SYSTEM

[75] Inventor: Kazutoshi Tominaga, Osaka, Japan

[73] Assignee: Kabushiki Kaisha Tominaga Jyushi Kogyosho, Osaka, Japan

[21] Appl. No.: 09/031,877

[22] Filed: Feb. 27, 1998

[30] Foreign Application Priority Data

Feb. 28, 1997 [JP] Japan ................................... 9-045914

[51] Int. Cl.[7] ........................................................ A01K 1/00
[52] U.S. Cl. ......................................... 119/472; 119/452
[58] Field of Search ................................... 119/416, 418, 119/452, 472, 474, 484, 498, 475, 500

[56] References Cited

U.S. PATENT DOCUMENTS

| | | | |
|---|---|---|---|
| 3,865,082 | 2/1975 | Lovitz et al. ........................... | 119/474 |
| 3,994,262 | 11/1976 | Suchowski et al. ..................... | 119/452 |
| 4,021,975 | 5/1977 | Calkins ................................... | 119/484 |
| 5,092,269 | 3/1992 | Phillips et al. .......................... | 119/452 |
| 5,331,920 | 7/1994 | Coiro, Sr. et al. ....................... | 119/418 |
| 5,664,524 | 9/1997 | Piglia et al. ............................. | 119/452 |
| 5,664,525 | 9/1997 | Phillips et al. .......................... | 119/452 |

*Primary Examiner*—Robert P. Swiatek
*Assistant Examiner*—Elizabeth Shaw
*Attorney, Agent, or Firm*—Armstrong, Westerman, Hattori, McLeland & Naughton

[57] ABSTRACT

A lip member for an opening of a housing for a small animal such as a rodent, or the like, includes a main lip member body made of synthetic resin. The main lip member body has an opening for the small pet animal to pass through. The main lip member body also includes a fixing unit for detachably fixing the main lip member body to the housing for a small pet animal. The main lip member body further includes a tube connector for detachably connecting a passage tube to the main lip member body. Further, a ring member made of metal is mounted along a peripheral portion of the opening of the main lip member body.

4 Claims, 10 Drawing Sheets

LIP MEMBER FOR AN OPENING OF A HOUSING FOR A SMALL PET ANIMAL SUCH AS A RODENT AND HOUSING SYSTEM

BACKGROUND OF THE INVENTION

1. Field of the Invention

The present invention relates to a lip member for use in an opening of a housing for a small pet animal such as a rodent, e.g., a hamster or the like, and to a housing system.

2. Description of the Related Art

Recently, hamsters have become popular small pet animals especially for city dwellers since hamsters have a nice appearance and good behavior and are easy to keep even in a relatively small house such as an apartment house, a town house, and the like.

Some conventional housings for breeding and observing hamsters have a structure for connecting an additional passage tube.

For example, a plastic molded housing having an opening formed on a side wall thereof for directly connecting a passage tube, or a housing having an opening formed on a side wall thereof with a lip member fitted around the opening for connecting a passage tube, have been provided.

However, since rodents such as hamsters, or the like, have a gnawing habit, a peripheral portion of an opening or a lip member attached around the opening, may be gnawed breaking the peripheral portion or the lip member. When such a peripheral portion of the opening or the lip member is gnawed, an additional passage tube can not be connected thereto. Further, hamsters may escape through the gnawed portion.

Additionally, in a housing having an opening formed on a side wall thereof for directly connecting a passage tube, the housing requires an integral structure for connecting the passage tube at a periphery of the opening, which complicates the structure of the housing. This also complicates a mold for manufacturing the housing, resulting in a high manufacturing cost.

On the other hand, in a housing having an opening formed on a side wall thereof with a lip member fitted around the opening for connecting a passage tube, if the lip member is made of metal, for example, it is possible to prevent the lip member, or a periphery of the opening, from being gnawed. However, such a metal lip member is more difficult to form than in a plastic lip member, and therefore the production cost will be increased.

SUMMARY OF THE INVENTION

The object of the present invention is to provide a lip member for an opening of a housing for a small pet animal such as a rodent, or the like, that can reduce the production cost, and effectively can prevent the opening and/or structure around the opening from being gnawed so that hamsters can not escape from the gnawed portion.

In order to achieve the above mentioned object, a lip member for a housing according to the present invention includes:

a main lip member body made of synthetic resin, the main lip member body having an opening for the small pet animal to pass through;

fixing means for detachably fixing the main lip member body to the housing for a small pet animal with a first side of the main lip member body facing the housing in a state that the opening of the main lip member body coincides with an opening formed on a side wall of the housing;

tube connecting means for detachably connecting a passage tube to a second side of the main lip member body in a state that the opening of the main lip member body coincides with an end of the passage tube; and a ring member made of metal, the ring member being mounted along a peripheral portion of the opening of the main lip member body.

Since a metal ring is mounted along a peripheral portion of the opening of the lip member, it is possible to effectively prevent the peripheral portion from being gnawed by hamsters too much to prevent the peripheral portion from being broken.

Since the lip member according to the present invention is made of synthetic resin, manufacturing is made more simple as compared to the case where a lip member is made of metal by a thermal forming method, for example, and the cost of the material is less expensive. Accordingly, the production cost can be reduced.

On the other hand, it is preferable that the ring member is mounted to the main lip member body by an insert forming method. When such structure has been employed, it is possible to mount the ring to the main lip member body easily and firmly.

According to another aspect of the present invention, a housing system for a small pet animal, comprising:

a housing having an opening;

a passage tube; and a lip member for the opening of a housing, the lip member including:

a main lip member body made of synthetic resin, the main lip member body having an opening for the small pet animal to pass through;

fixing means for detachably fixing the main lip member body to the housing with a first side of the main lip member body facing the housing in a state that the opening of the main lip member body coincides with the opening of the housing;

tube connecting means for detachably connecting a passage tube to a second side of the main lip member body in a state that the opening of the main lip member body coincides with an end of the passage tube; and a ring member made of metal, the ring member being mounted along a peripheral portion of the opening of the main lip member body.

In the second aspect of the present invention, it is preferable that the housing includes:

a base tray made of synthetic resin, the base tray having a bottom wall and a side wall extending upward from a periphery of the bottom wall, an upper end of the side wall of the base tray defining an upper end periphery; and an upper cover made of synthetic resin, the upper cover covering the base tray, the upper cover having a top wall and a side wall extending downward from a periphery of the top wall, a lower end of the side wall of the upper cover defining a lower end periphery, the lower end periphery being fitted to the upper end periphery in a state that the upper cover covers the base tray, wherein the base tray is provided with a U-shaped cut-out portion formed on an upper portion of its side wall, and the upper cover is provided with an opposing U-shaped cut-out portion formed on a lower portion of its side wall that corresponds to the U-shaped cut-out portion of the base tray so that both the cut-out portions provide an opening in a state that the upper cover covers the base tray, and wherein the fixing means of the main lip member body includes a first engaging member for engaging with the base tray and a second engaging member for engaging with the upper cover, and the base tray and the upper cover are connected with each other by way of the main lip member body in a state that the main lip member body is attached to the opening of the housing, with each of the first and second engaging members engaged with the base tray and the upper cover, respectively.

When such structure is employed, since it is possible to connect the base tray and the upper cover by the lip member, other connecting means can be omitted and the number of components can be reduced.

Other objects and features will be apparent from the following detailed description of the invention with reference to the attached drawings.

BRIEF DESCRIPTION OF THE DRAWINGS

The present invention will be more fully described and better understood from the following description, taken with the appended drawings, in which.

DETAILED DESCRIPTION OF THE PREFERRED EMBODIMENTS

Preferred embodiments of the present invention will now be described, in detail, with reference to the accompanying drawings.

Figure 1:
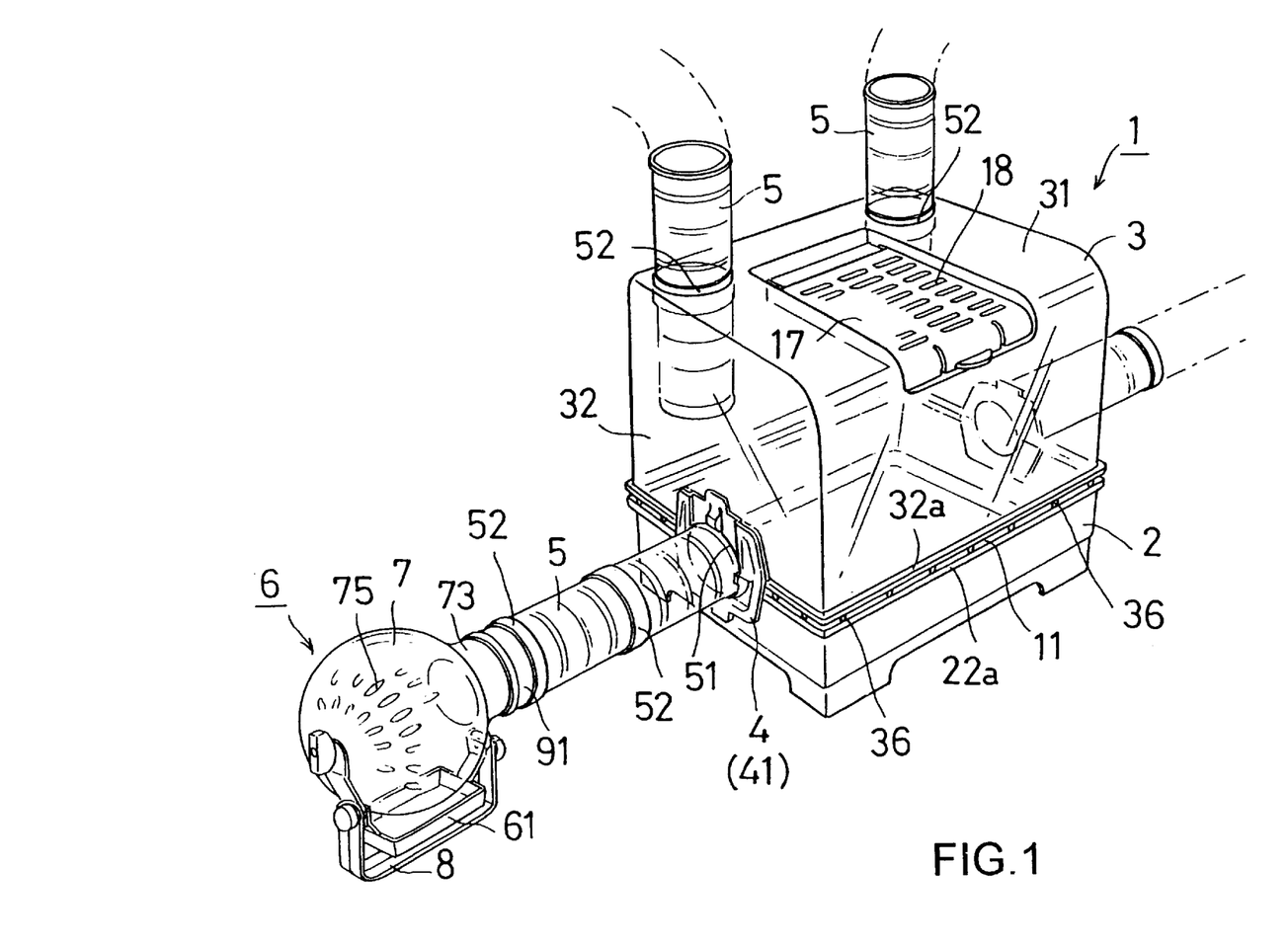
FIG. 1 is a perspective view showing the hamster breeding system of an embodiment according to the present invention.
Figure 2:
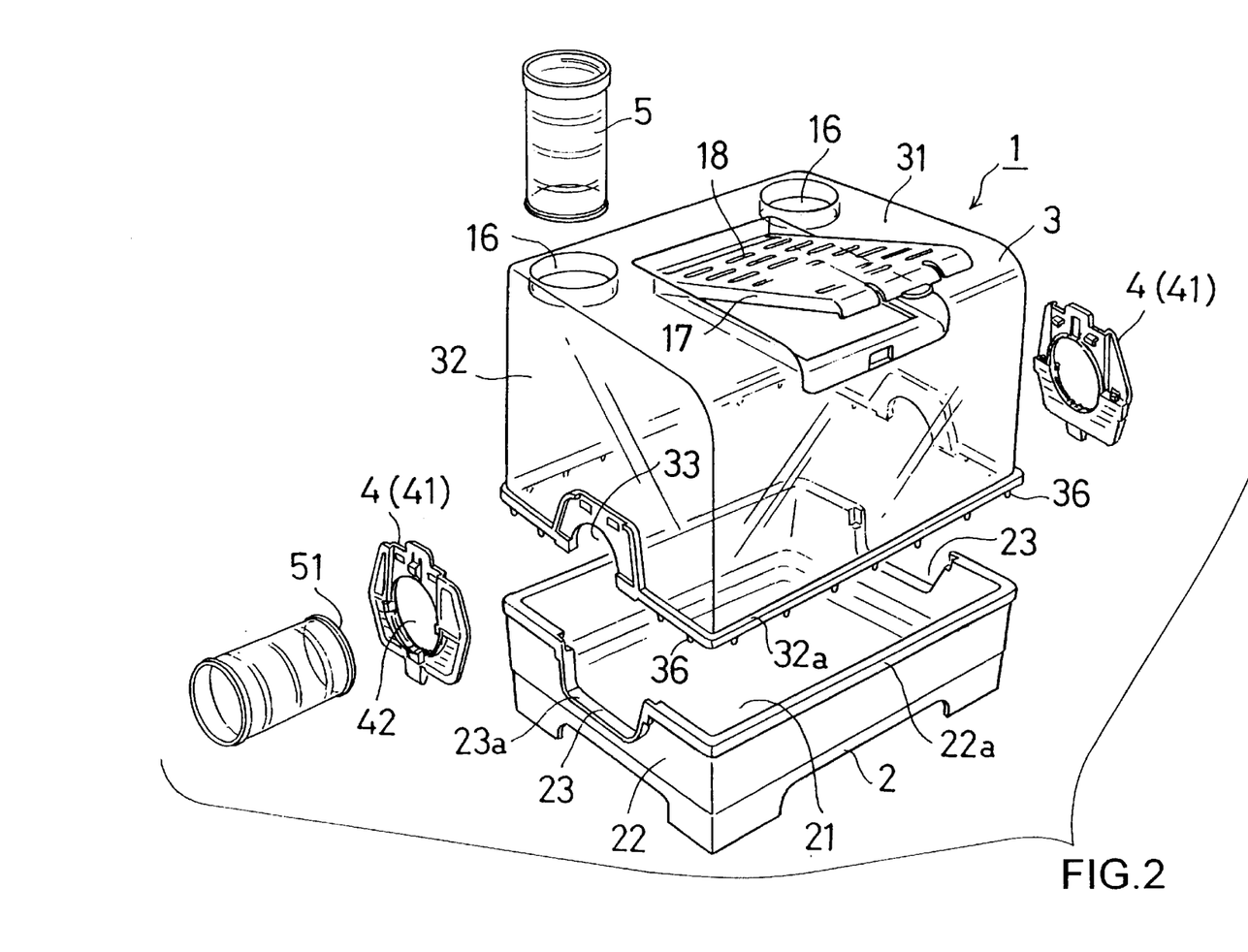
FIG. 2 is a perspective view thereof in a disassembled state.
Figure 3:
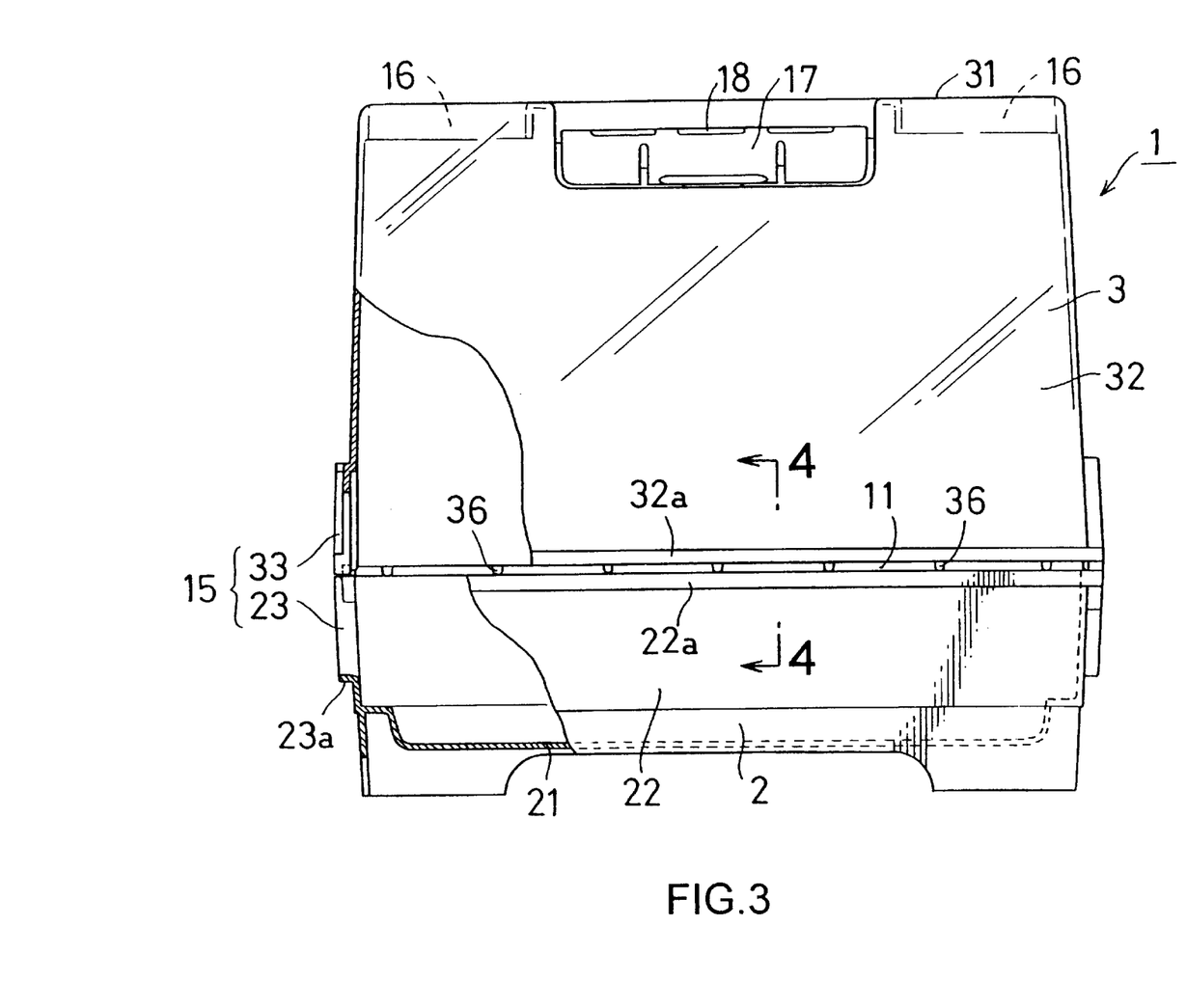
FIG. 3 is a partially cut-out side view of a housing employed in the breeding system of the embodiment.

FIGS. 1 to 3, show an embodiment of a breeding system for hamsters according to the present invention.

As shown in these figures, in the breeding system of the present invention, accessories such as a rotary plaything 6 and a passageway tube 5, or the like, can be connected to the breeding housing 1, if desired, so that a desired breeding environment can be formed.

The breeding housing 1 includes a base tray 2, an upper cover 3, and a lip member 4 that connects the upper cover 3 to the base tray 2.

The base tray 2 is a molded hard plastic article of a box shape with its upper end opened. As shown in FIG. 2, the base tray 2 has a bottom wall 21 and side walls 22 extending upward from a periphery of the bottom wall 21 and formed integrally therewith. Among the side walls 22, a U-shaped cut-out portion 23 is provided at a central upper portion of each opposing two side walls 22, respectively.

Figure 4:
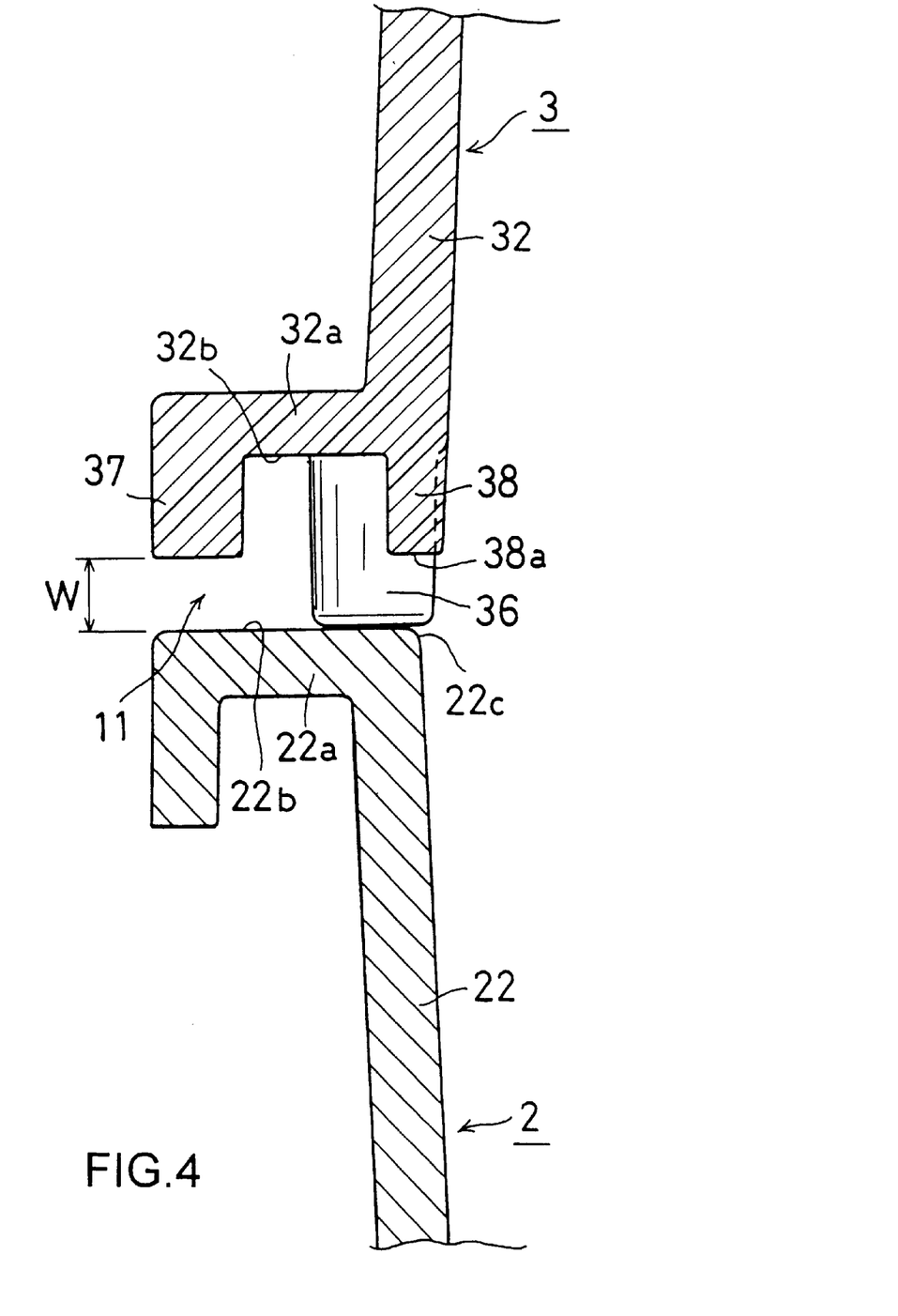
FIG. 4 is an enlarged cross-sectional view taken along the line 4—4 of FIG. 3.
Figure 5:
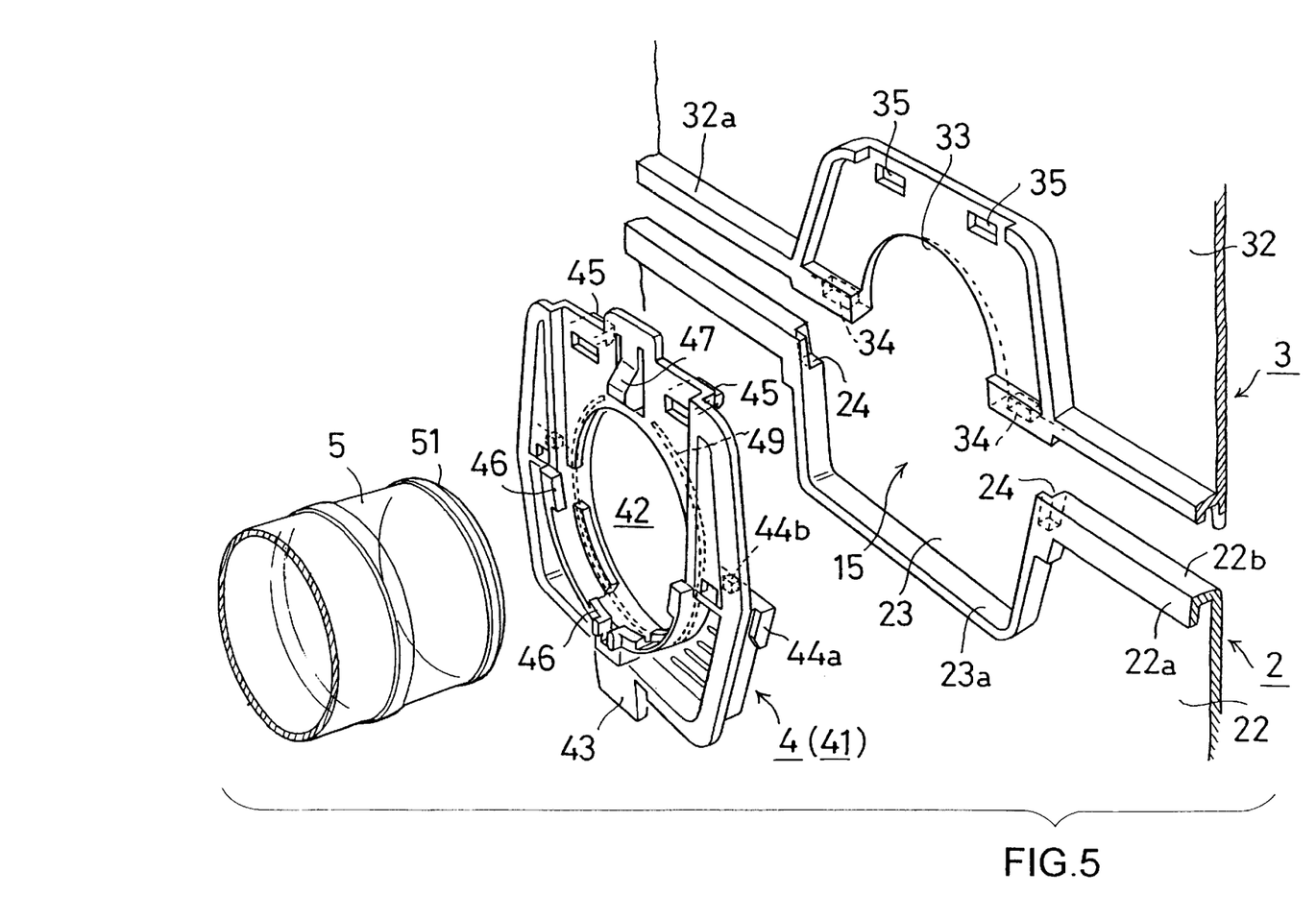
FIG. 5 is a perspective view showing a lip member of the housing of the embodiment in disassembled state.
Figure 6:
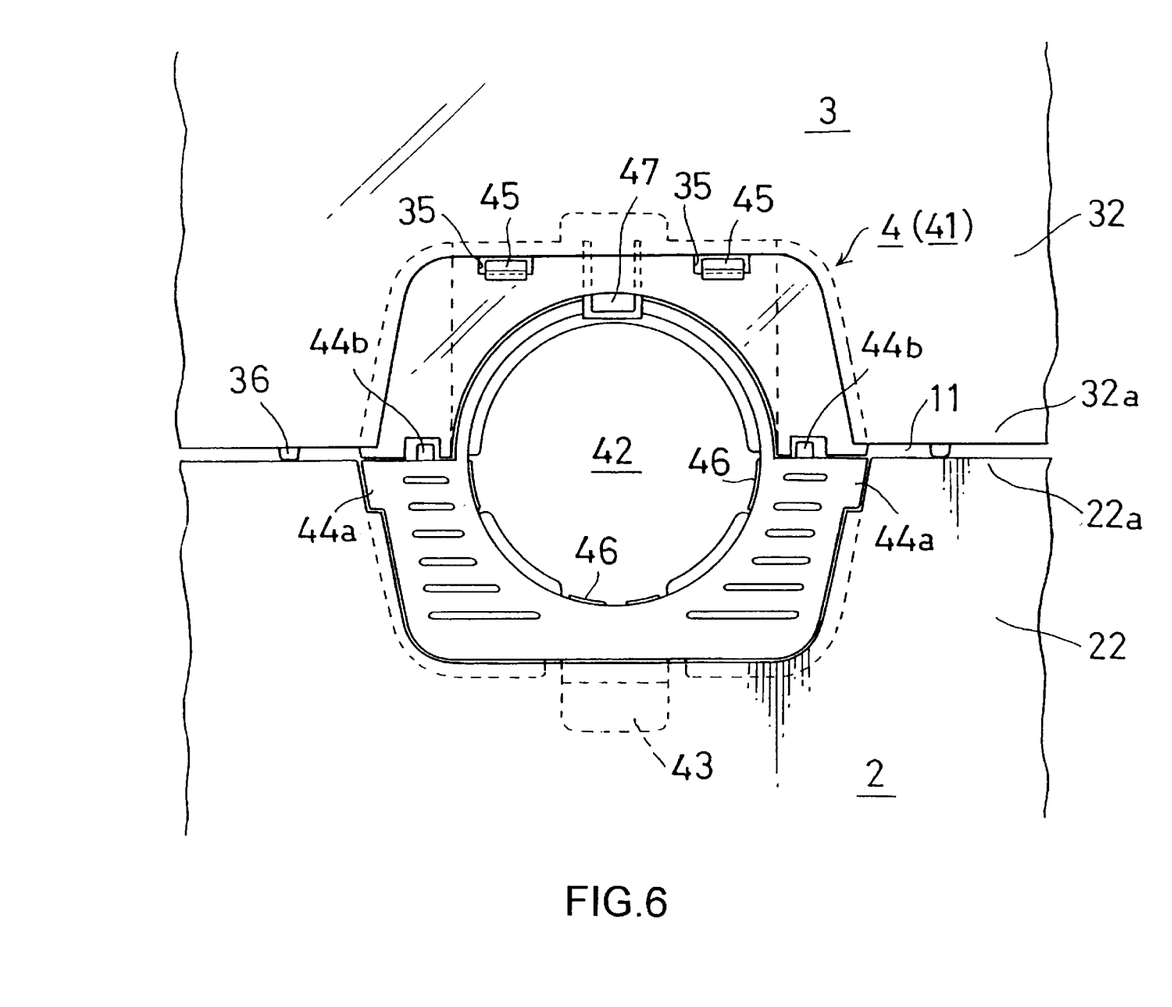
FIG. 6 is an inside view the lip member employed in the housing of the embodiment.
Figure 7:
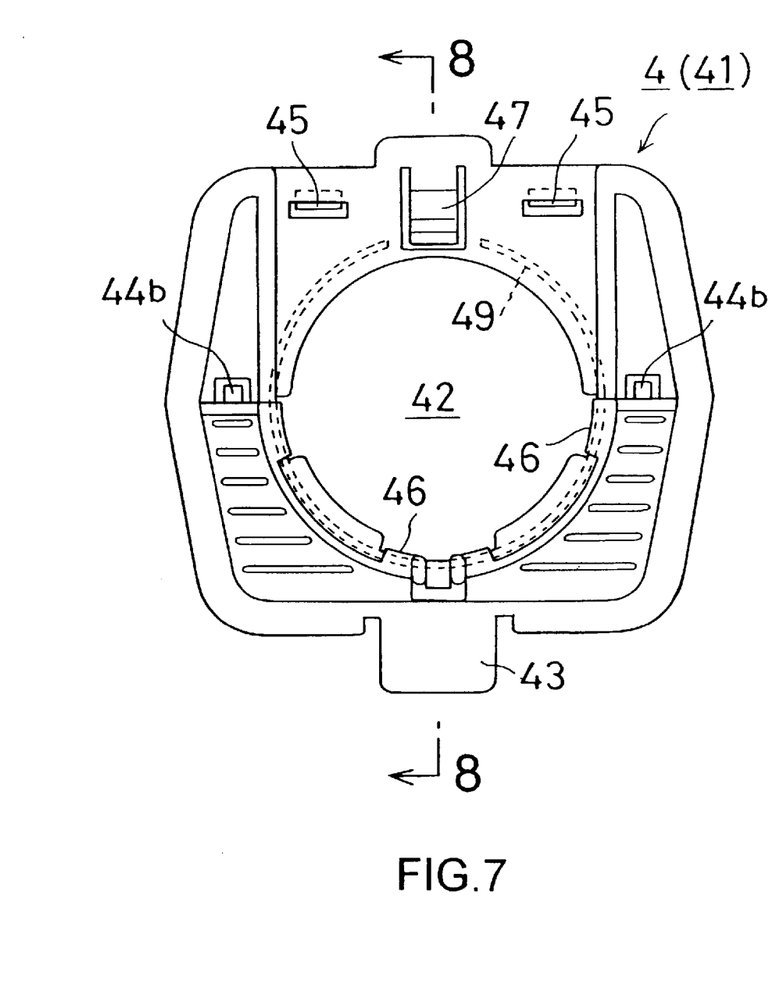
FIG. 7 is an outside view of the lip member employed in the housing of the embodiment.
Figure 8:
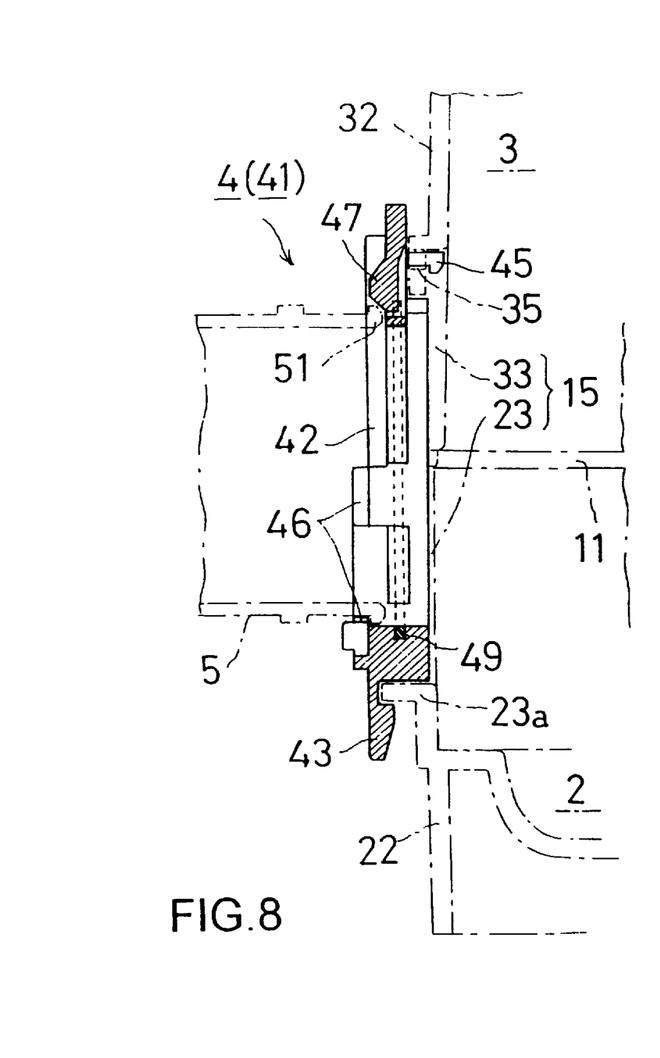
FIG. 8 is a cross-sectional view taken along the line 8—8 of FIG. 7.

As shown in FIGS. 4 and 5, an upper end periphery 22a is defined by an upper end of the side wall 22 of the base tray 2. The upper end periphery 22a and a cut-out periphery 23a of the U-shaped cutout portion 23 protrude outwardly to form a flange. At the insides of corners between the upper end periphery 22a and cutout periphery 23a, recesses 24 for positioning the lip member 4, which will be described below, are provided.

A corner portion 22c between a top surface 22b of the side wall 22 of the base tray 2 and an inner surface of the side wall 22, in other words, a corner portion 22c located at an inner peripheral edge of the upper end periphery 22a, is rounded so that the corner portion 22c is prevented from being gnawed by hamsters.

As shown in FIGS. 1 to 3, the upper cover 3 is a transparent molded hard plastic article of a box-shape with its lower end opened. The upper cover 3 includes a top wall 31 and side walls 32 extending downward from a periphery of the top wall 31 and formed integrally therewith. A lower end periphery 32a is defined by a lower end of the side wall 32 of the upper cover 3. The lower end periphery 32a protrudes outwardly to form a flange. Further, the lower end periphery 32a is formed so as to fit the upper end periphery 22a of the base tray 2. Each of two opposing side walls 32 includes a reversed U-shaped cut-out portion 33, corresponding to the U-shaped cutout 23 of the base tray 2, provided at a central lower portion of each of the opposing two side walls 32.

As best shown in FIG. 4, an inner periphery of a lower end surface 32b of the side wall 32 has a plurality of protrusions 36 for providing slits along the lower end periphery 32a. The protrusions 36 are of columnar shape so that they are prevented from being gnawed by hamsters.

The lower end surface 32b of the side wall 32 has, a protrusion hiding wall 37 that protrudes a lesser amount than the length of the protrusion 36. The hiding wall 37 is formed continuously almost all circumference of the periphery 32a and integrally with the lower end surface 32b. An inner peripheral side of the periphery 32a has a rib 39 that protrudes a lesser amount than the length of the protrusion 36. The rib 38 is formed continuously around almost all of the circumference of the periphery 32a and integrally therewith. A top of the rib 38 is rounded so as to prevent from it being gnawed by hamsters, As shown in FIGS. 1 to 3, upper entrances 16, 16 that hamster can pass through are formed at both the right and left sides of a rearward portion of the top wall 31 of the upper cover 3. Further, a lid 17 with a plurality of air apertures 18 is provided at a center portion of the top wall 31.

As shown in FIG. 5, at inside ends of the lower end periphery 32a in the proximity of the reversed U-shape cut-out portion 33, recesses 34 for positioning the lip member 4, which will be described below, are provided. At right and left sides of the upper portion of the reversed U-shaped cut-out portion 33, engaging apertures 35 for engaging the lip member 4 are formed.

The housing 1 having a good appearance with a generally one-box shape, is achieved by covering the upper cover 3 on the base tray 2 so that the opposing lower end periphery 22a and upper end periphery 32a are fitted. The ventilating slits 11 are provided between the opposing lower end periphery 22a of the base tray 2 and the upper end periphery 32a of the upper cover 3 along all the circumference of the housing since the protrusions 36 of the upper cover 3 are abutted to the top surface 22b of the side wall 21 of the base tray 2. Besides, side entrances 15, 15 are formed since the U-shaped cut-out portion 23 of the base tray 2 and the reversed U-shaped cut-out portion 33 of upper cover 3 are disposed across from each other.

As shown in FIG. 4, the height W of the ventilating slits 11 are preferably 1.0 mm–4.0 mm, and more preferably, from 1.5 mm or higher to 3.0 mm or lower. If the height of the slits 11 is too low, it may be impossible to secure a sufficient ventilation within the housing. To the contrary, if the height of the slits 11 is too high, the opposing upper end periphery 22a and the lower end periphery 32a and protrusions existing around the slits 11 may be gnawed and broken by hamsters.

As shown in FIGS. 1 and 2, passageway tube 5 is a transparent or semitransparent hard plastic article that has a flange 51 at outer circumference of both ends. One tube 5 can be connected with another tube 5 through a connecting ring 52 made of soft plastic so that a passageway with a desired length can be obtained.

In the present embodiment, the tube 5 is inserted into each of the upper entrances 16, 16 and connected to the upper cover 3 through connecting ring 52 that is connected to the tube 5 with the outer surface of ring 52 tightly contacting the inner surface of the entrance 16. Alternatively, any of the entrances 16, 16 may be closed by a closing member (not shown).

As shown in FIG. 5 to FIG. 8, the lip member 4, that is disposed at the cut-out portion 23 of the base tray 2 and the cut-out portion 33 of the upper cover 3, comprises a lip body 41 that has a passage 42 at its center portion. The lip body 41 is a molded hard plastic article. Also, a metal ring 49 is mounted along a peripheral portion of passage 42 of the lip body 41 by an insert forming method for preventing hamsters from gnawing.

The lip member 4 has an inner side that faces, the inside of the housing and an outer side that faces the outside of the housing. The lip member 4 has integrally formed upper hooks 45, 45 extending inwardly at both the right and left upper portions of the portions upward the passage 42 at the inner side of the lip member 4. The lip member 4 has a lower hook 43 extending downwardly from its lower end and formed integrally therewith. Both right and left sides of the passage 42 have a protrusion 44a that is formed integrally with the lip member 4 at the inner side of the lip member 4 so that the protrusion 44a corresponds to the recess 24 of the base tray 2. Further, both right and left sides of the passage 42 have a protrusion 44b that is formed integrally with the lip member 4 at the inner side of the lip member 4 so that the protrusion 44b corresponds to the recess 34 of the upper cover 3.

An upper portion of the lip member 4 is attached to the reversed U-shaped cut-out portion 33 of the upper cover 3 in the following manner. The protrusion 44b of the lip member 4 is inserted into the recess 34 of the upper cover 3. Then the top engaging portion of the upper hook 45 of the lip member 4 is engaged with an inner surface of engaging aperture 35 of the upper cover 3. On the other hand, a lower portion of the, lip member 4 is attached to the cut-out portion 23 of the base tray 2 in the following manner. The protrusion 44a of the lip member 4 is inserted into the recess 24 of the base tray 2 so that a top engaging portion of the lower hook 43 is engaged with the cut-out portion periphery 23a of the base tray 2.

As described above, the base tray 2 and upper cover 3 are fixed to each other through the lip members 4, 4. By detaching the protrusion 44a from the recess 24 by releasing the engagement of the lower hook 43 of the lip member 4 and base tray 2, the connection between the lip member 4 and the base tray 2 is released, By detaching the protrusion 44b from recess 34 by releasing the engagement of the upper hook 45 of the lip member 4 and the upper cover 3, the connection between the lip member 4 and upper cover 3 is released.

On the outer side of the lip member 4, a flange hook 46 is provided at the lower peripheral portion of passage 42 to engage a lower semicircle portion of the flange 51 of the end of passage tube 5. An elastic protrusion 47 is formed at an upward portion of the passage 42 on the outer side of lip member 4. The lower semicircle of the flange 51 of the passage tube 5 is pushed downward into the flange hook 46 of the lip member 4 to align the axis of the tube 5 with the axis of the passage 42 and so that the tube 5 is connected to the lip member 4 by an elastic engagement between the elastic protrusion 47 and the flange 51 of tube 5. When the connected tube 5 is slid upward, the engagement of the upward portion of the flange 51 by the elastic protrusion 47 is released and the flange 51 will come off from the flange hook 46. Thus, the tube 5 can be detached from the lip member 4.

In the present embodiment, the lower hook 43 comprises an engaging means for the base tray, the upper hook 45 comprises an engaging means for the upper cover, and both the hooks 43 and 45 comprise a fixing means for the body. Further, the flange hook 46 and elastic protrusion 47 comprise a connecting means for tube.

In the present embodiment, instead of connecting the tube 5 with the lip member 4 of the base tray 2 and upper cover 3, the passage 42 may be closed by a closing means.

Figure 9:
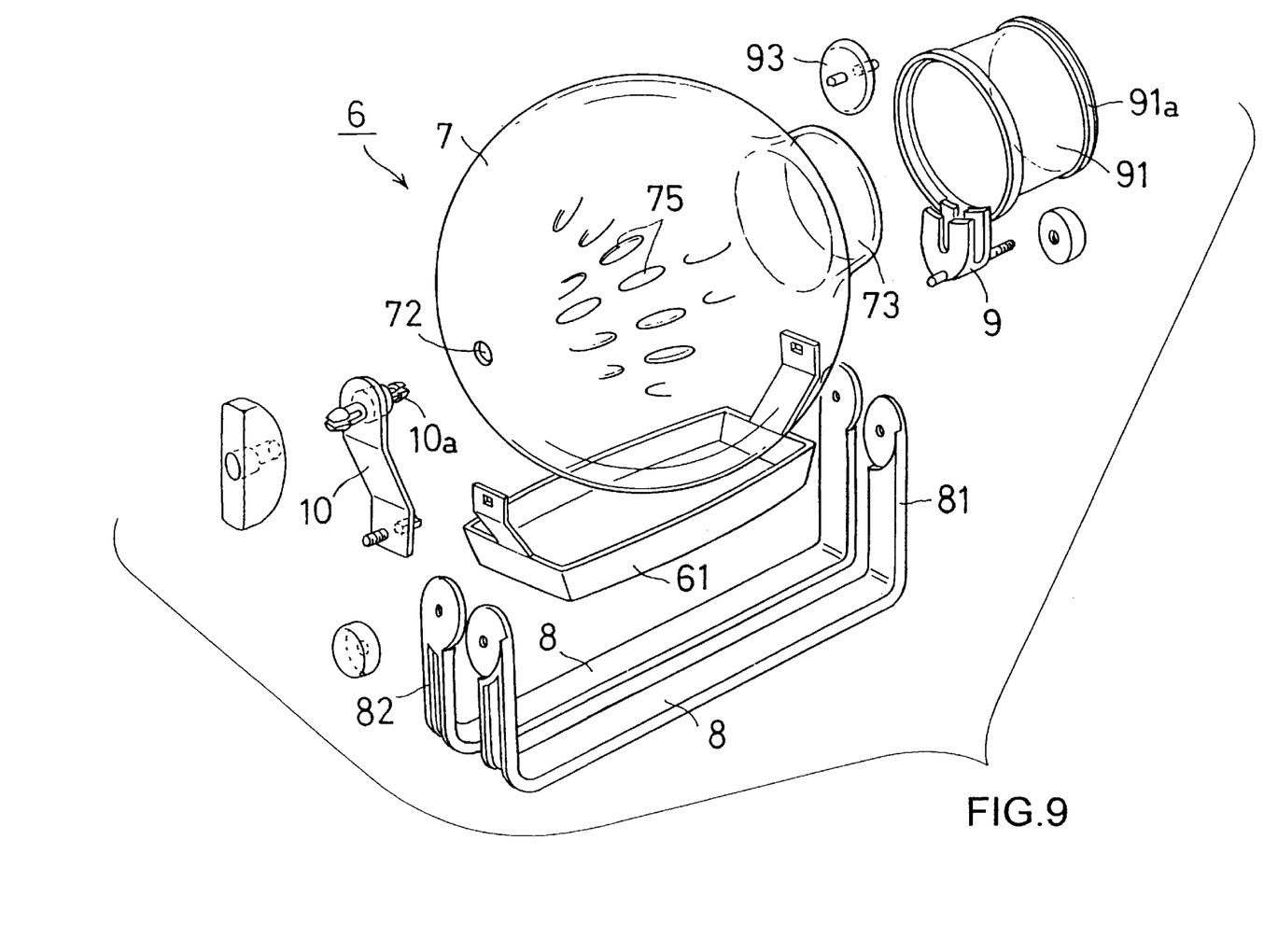
FIG. 9 is a perspective view of a rotary plaything employed in the system of the embodiment in a disassembled separate state.
Figure 10:
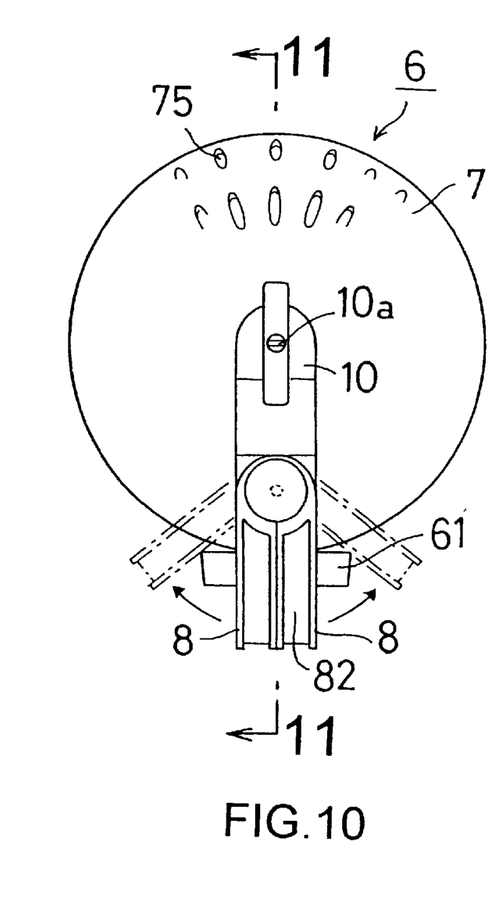
FIG. 10 is a rear view of the rotary plaything of the embodiment.
Figure 11:
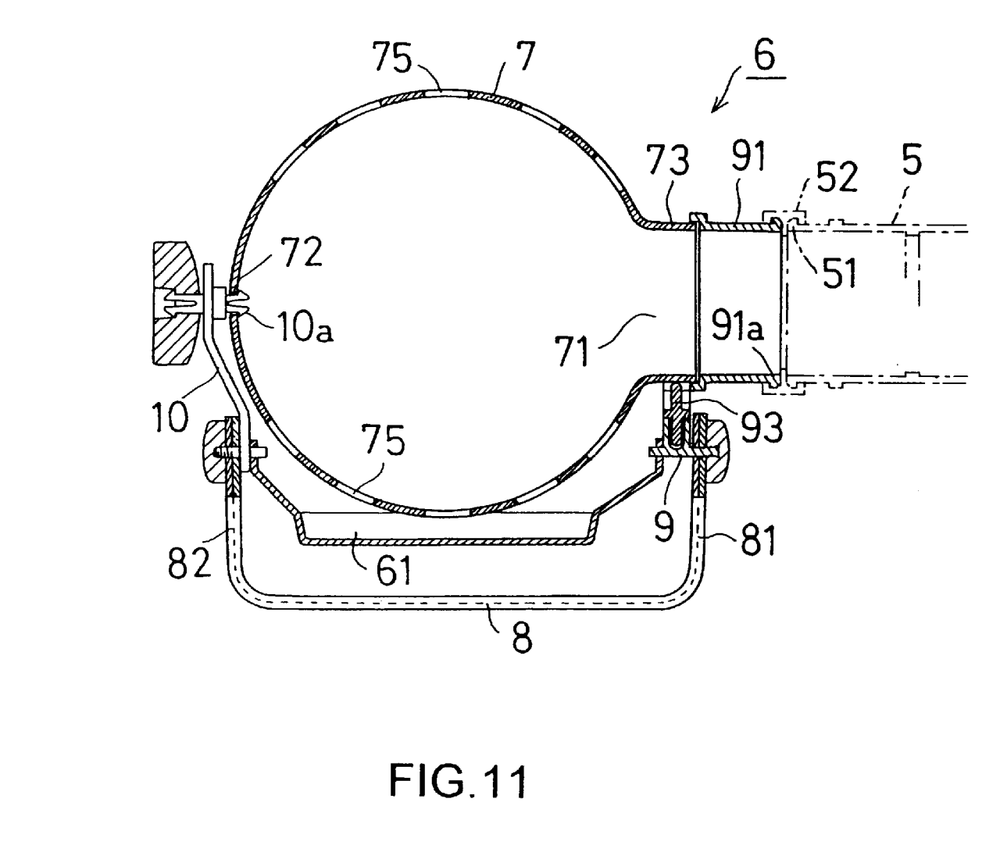
FIG. 11 is a cross-sectional view taken along the line 11—11 of FIG. 10.

As shown in FIG. 9 to FIG. 11, a rotary plaything 6 has a transparent or semitransparent ball-shaped hollow rotator 7, a pair of legs 8, 8 made of hard plastic and bearing means 9, 10 that rotatably support the hollow rotator 7 to the legs 8, 8.

The hollow rotator 7 has a circular hole 71 at one end of a predetermined rotating axis so that the central axis of the hole 71 is aligned with the rotating axis. The hollow rotator 7 has a supporting aperture 72 at the other end of rotating axis, A cylindrical roller contact member 73 protrudes outward and is provided on an outer side of the hole 71 of the hollow rotator 7 so that the axis of the roller contact member 73 is aligned with the rotating axis. A number of air holes 75 are provided on the wall of the hollow rotator 7.

Corresponding upper ends of each upright portion 81, 82 of the pair of legs 8, 8 are rotatably attached to each other to allow the legs to be opened and closed. Also, the point where each of the upper end portions of the legs are attached to each other becomes a supporting point. The front bearing member 9 is a molded hard plastic article. The bearing member 9 is fixed to the front upright portion 81 of the leg 8. The backside bearing member 10 is a molded hard plastic article. The bearing member 10 is fixed to the backside upright portion 82.

A roller 93 is rotatably attached to the bearing member 9 at a position that corresponds to the outer circumference of the roller contact member 73. A cylindrical passage member 91 is integrally provided with the bearing member 9 so that an axis of the passage member 91 is aligned with the rotating, axis of the rotator 7. The circumference of the cylindrical passage member 91 is the same with the circumference of the passage tube 5. The cylindrical passage member 91 has a flange at its one end like that of the tube 5, and therefore may be connected to the tube 5 through the tube connecting ring 52. The cylindrical passage member 91 may be directly connected with the lip member 4. In that case, the legs 8, 8 may be omitted by supporting the bearing members 9, 10 at the housing side.

The roller contact member 73 of one end of the hollow rotator 7 is located so that an end portion of the roller contact member 73 faces the cylindrical passage hole 91. The outer surface of the roller contact member 73 contacts the roller 93 of the front bearing member 9 and accordingly the rotator 7 is rotatably supported. The other end of the hollow rotator 7 is rotatably supported since a bearing axis 10a of the bearing member 10 is inserted in the supporting aperture 72. Therefore, the hollow rotator 7 rotates With both the front side and backside supported by the bearing members 9, 10. At the front side of the hollow rotator 7, the roller 93 rotates and contacts the outer surface of the roller contact member 73 to allow the hollow rotator 7 to rotate.

A litter tray 61 may be provided under the hollow rotator 7 so that the litter tray 61 is supported between the upright portions 81 and 82.

In use, the rotary plaything 6 is usually connected with the breeding housing 1 through passage tube 5. For example, one end of the passage tube 5 is connected with the lip member 4 of the housing 1 as described above, and the other end of the passage tube 5 is connected with the cylindrical passage member 91 as described above.

In the embodiment, hamsters enclosed in the housing 1 will pass through the tube 5 and go into the hollow rotator 7 through the cylindrical member 91 of the rotary plaything 6 to rotate the rotator 7.

As described above, in the hamster breeding system of the present embodiment, since the ventilating slits 11 are provided between the base tray 2 and the upper cover 3 by forming the protrusions 36 on the lower end periphery 32b of the upper cover 3 and by interposing the protrusions 36 between the base tray 2 and upper cover 3, it is possible to keep sufficient ventilation in the housing 1 through the slits 11 and further through the air apertures 18 of the top wall 31.

Additionally, it is a simple structure since the protrusions 36 are provided on the lower end periphery 32b of the upper cover 3, the structure of mold for manufacturing the housing 1 will not be complicated and reduction of cost will be achieved.

Further, since the protrusions 36 are provided in a large number with a predetermined distance between each of them along the lower end periphery 32b of the upper cover 3, an appropriate number of slits 11 are provided along the entire periphery and all circumference of the base tray 2 and the upper cover 3. Therefore, the inside of housing 1 can be evenly ventilated and secure a good air flow.

Since the protrusions 36 are provided at the inner periphery of the lower end periphery 32b, they are difficult to be seen from the outside of the housing 1. Additionally, since the hiding wall 37 is formed at outer circumference of the lower end periphery 32b to hide the protrusions 36, the protrusions 36 are almost invisible from the outside and a good appearance can be achieved.

Since each of the protrusions 36 is a columnar shape, the protrusions 36 are prevented from being gnawed and broken by hamsters. Since the corner portion 22c of the upper end periphery 22a of the base tray 2 and the top portion 38a of the rib 38 formed at the inner peripheral side or the lower periphery 32a are rounded, these portions are also prevented from being gnawed and broken by hamsters.

Since the rigidity of the lower end periphery 32a is strengthen by the hiding wall 37 and rib 38 of the lower end periphery 32a, it is possible to prevent the lower end periphery 32a from being broken when the lower end periphery 32a is bumped with other components during assembly and/or disassembly.

Since a metal ring 49 is inserted at the periphery portion of the passage 42 of the lip member 4 that is to be connected to the housing 1, the periphery portion of the passage 42 is effectively prevented from being gnawed too much by hamsters. Therefore, hamsters are prevented from escaping due to a breakage made from gnawing.

Since the metal ring 49 is fitted by an insert forming method is to be hidden within the lip member 4, the ring 49 can be fixed to the lip member 4 more easily and firmly than the case where, for example, the ring is merely attached afterward or the like. Further, since the ring is hidden, a good appearance can be achieved.

Since the lip member 4 is a molded hard plastic article, it is possible to manufacture the lip member more effectively than in the case where the member is made of metal, by a thermal forming method, for example, and the material cost is less expensive, and the production cost can be reduced. Since the lip member 4 is manufactured separately from the housing 1, the structure of the mold for the housing becomes less complicated than the case where a lip member structure is integrally formed with the housing 1, and therefore further reduction of cost can be attained.

In the present embodiment, since the lip member 4 has the members for connecting the base tray 2 and upper cover 3 other than the members for connecting the tube 5, the number of components can be reduced to lower the production cost.

In the rotary plaything 6 of the present embodiment, since the hollow rotator 7 is supported at both the front side and back side on the rotating axis, the rotator 7 can keep a balanced rotation. Further, since the roller contact member 73 is provided with the hollow rotator 7 so that the axis of the roller contact member 73 is aligned with the rotating axis of the rotator 7 and the roller 93 is rotatably attached to the bearing member 9 at a position that corresponds to the outer circumference of the roller contact member 73, the outer surface of the roller contact member 73 directly contacts the roller 93 to rotatably support the rotator 7 so that the rotator can rotate smoothly. Therefore, when the rotator 7 rotates, a load will not concentrate unevenly and the rotator will not wobble, and it is possible to prevent from the rotator 7 being worn at an early stage and to keep a balanced rotation for a long time.

In the present embodiment, since the passage tube 5 is disposed at the hole 71 of the hollow rotator 7, hamsters enclosed in the housing 1 can go to and from the rotary plaything 6. Therefore, the plaything 6 can be located directly, outside the housing without any trouble. Further, since the hole 71 of the hollow rotary 7 has a cylindrical passage member 91 that can be connected to the passage tube 5, the tube 5 can be connected to the rotary plaything 6 easily.

Because the roller contact member 73 is provided with the hollow rotator 7 and the roller 93 is provided with the bearing member 9, the rotary plaything 6 has a simple structure, the production cost is lessened and a less expensive product can be provided.

Since the bearing member 9 and the cylindrical passage member 91 are formed integral with each other in the rotary plaything 6, the number of components can be diminished and the assembling process becomes easy thereby reducing production costs.

Figure 12:
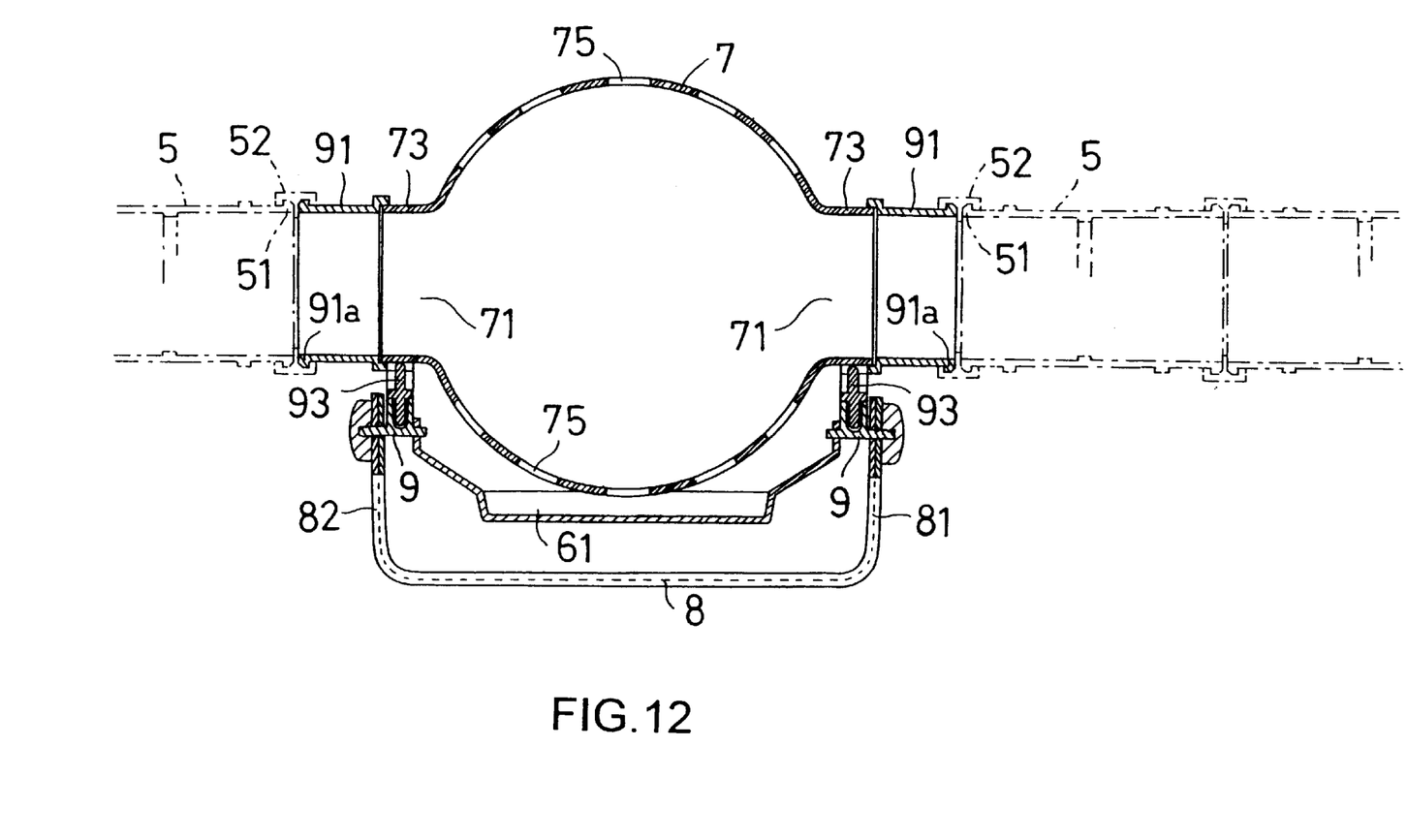
FIG. 12 is a side cross-sectional view of a modified embodiment of the rotary plaything.

Since the litter tray 61 is provided under the hollow rotator 7 in the present rotary plaything 6, excrement of hamsters can be caught by the litter tray 61 to prevent the excrement from scattering, In the above described embodiment, the rotary plaything 6 has the hole 71 only at one side of the rotating axis. However, the present invention is not limited to such an embodiment. As shown in FIG. 12, the holes 71, 71 and roller contact members 73, 73 may be provided on both sides along the rotating axis of the hollow rotator 7 so that both sides are supported by the bearing members 9, 9 having a rollers 93 as described above, and the cylindrical passage members 91, 91 may be provided both sides thereof. In this case, the rotary plaything 6 can be positioned midway in a passageway for hamsters by connecting passage tubes 5, 5 to the holes 71, 71 at both ends of the hollow rotator 7.

In the above described embodiment, the hollow rotator 7 of the rotary plaything 6 has a ball-shape. However, in the present invention the rotator may be made into many shape, for example a drum shape.

In the above described embodiment, the roller 93 is used to rotatably support roller contact member 73. However, the present invention is not limited thereto and a ball such as a hard ball or the like may be used. Further, the number of rollers, like roller 93, is not limited to one.

As described above, according to the lip member for an opening of a housing for a small animal such as rodent, or the like, since a metal ring is mounted around the peripheral portion of an opening for a small animal to pass through, the peripheral portion is prevented from being gnawed, and therefore the components around the opening are effectually prevented from being broken. Further, hamsters are prevented from escaping from the broken portion of the housing. Further, since the lip member according to the present invention is made of synthetic resin, it is advantageous that the lip member can be manufactured more effectually than in a case that a lip member is made of metal, for example, by a thermal forming method and that material is less expensive. Accordingly, it is advantageous that the production cost can be reduced.

When the ring member is mounted to the lip member by an insert forming method, it is advantageous that the ring member can be attached to the lip member easily and firmly.

When the lip member connects the base tray and the upper cover that form a housing for a small pet animal, it is advantageous that the number of components can be reduced and therefore further reduction of production cost can be achieved.

Though preferred embodiments according to the present invention are described, it should be recognized that various modifications are possible within the scope of, the present invention.

This application claims priority to Japanese Patent Application No. Hei 9(1997)-45914, the disclosure of which is incorporated by reference in its entity.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A lip member for an opening of a housing for small pet animal, said lip member comprising:
    a main lip member body made of synthetic resin, said main lip member body having an opening for the small pet animal to pass through;
    fixing means for detachably fixing said main lip member body to the housing with a first side of said main lip member body facing the housing in a state that said opening of said main lip member body coincides with the opening the housing;
    tube connecting means for detachably connecting the passage tube to a second side of said main lip member body in a state that said opening of said main lip member body coincides with an end of the passage tube; and
    a ring member made of metal, said ring member being embedded in a peripheral portion of said opening of said main lip member body, whereby said peripheral portion is present from being gnawed too much by the small pet animal.

2. The lip member as defined by claim 1, wherein said ring member is embedded in said main lip member body by an insert forming method.

3. A housing system for a small pet animal, comprising:
    a housing having a opening;
    a passage tube; and
    a lip member for the opening of a housing, said lip member including:
        a main lip member body made of synthetic resin, said main lip member body having an opening for the small pet animal to pass through;
        fixing means for detacably fixing said main lip member body to said housing with a first side of said main lip member body facing said housing in a state that said opening of said main lip member body coincides with said opening of said housing;
        tube connecting means for detachably connecting said passage tube to a second side of said main lip member body in a state that said opening of said main lip member body coincides with an end of said passage tube; and
        a ring member made of metal, said ring member being mounted along a peripheral portion of said opening of said main lip member body,
    wherein said housing includes:
        a base tray made of synthetic resin, said base tray having a bottom wall and a side wall extending upward from a periphery of said bottom wall, an upper end of said side wall of said base tray defining an upper end periphery; and
        an upper cover made of synthetic resin, said upper cover covering said base tray, said upper cover having a top wall and a side wall extending downward from a periphery of said top wall, a lower end of said side wall of said upper cover defining a lower end periphery, said lower end periphery being fitted to said upper end periphery in a state that said upper cover covers said base tray, wherein said base tray is provided with a U-shaped cut-out portion formed on an upper portion of its side wall, and said upper cover is provided with an opposing U-shaped cut-out portion formed on a lower portion of its side wall that corresponds to said U-shaped cut-out portion of said base tray so that both the cut-out portions provide an opening in a state that said upper cover covers said base tray, and wherein said fixing means of said main lip member body includes a first engaging member for engaging with said base tray and a second engaging member for engaging with said upper cover, and said base tray and said upper cover are connected with each other by way of said main lip member body in a state that said main lip member body is attached to said opening of said housing, with each of said first and second engaging members engaged with said base tray and said upper cover, respectively.

4. The housing system as defined by claim 3, wherein said ring member is mounted in said main lip member body by an insert forming method.

* * * * *